2,795,573
Patented June 11, 1957

2,795,573

SUSPENSION POLYMERIZATION OF VINYL ACETATE AND CROTONIC ACID

Gerald R. Barrett, Winchester, and Randolph Perry, Jr., Arlington, Mass., assignors to Monsanto Chemical Company, St. Louis, Mo., a corporation of Delaware No Drawing. Application February 16, 1954, Serial No. 410,706

10 Claims. (Cl. 260—85.7)

The present invention relates to improvements in the aqueous suspension copolymerization of vinyl acetate and crotonic acid.

It has been proposed heretofore to copolymerize vinyl acetate and crotonic acid in an aqueous medium containing benzoyl peroxide as a polymerization catalyst and polyvinyl alcohol as a protective colloid to form suspended particles of a copolymer of vinyl acetate and crotonic acid. Normally the copolymer particles are quite fine, and when dry the bulk of the particles pass through a 30 mesh screen and a minor portion of the particles also pass through a 60 mesh screen. Such particles have several disadvantages, for example, they are difficult to handle and package and occupy a relatively large volume per unit weight. Attempts to increase the particle size of the copolymer particles usually result in the formation of coagulated copolymer which cannot be processed satisfactorily. Consequently, it has been the experience that when polyvinyl alcohol is used as a protective colloid it is only possible to obtain fine particles as described above or coagulated copolymer, and hence it is not possible to obtain copolymers having average particles between these two extremes.

In accordance with the present invention, on the other hand, it is possible to control the size of the particles of copolymers of vinyl acetate and crotonic acid produced by polymerization of such monomers in an aqueous medium. Moreover, it is possible to produce coarser particles than those heretofore produced by the use of polyvinyl alcohol without forming substantial amounts of coagulated copolymer. It is also possible in accordance with the present invention to produce copolymer particles the bulk of which are quite uniform in size.

It is one object of this invention to provide an improved process of copolymerizing vinyl acetate and crotonic acid in an aqueous medium to produce copolymer particles the size of which may be controlled substantially as desired.

It is a further object of this invention to provide an improved process of copolymerizing vinyl acetate and crotonic acid in an aqueous medium to provide copolymer particles or beads which are sufficiently large to be handled and processed readily, but are sufficiently small to be used without grinding or comminution.

Still further objects and advantages of this invention will become apparent from the following description and appended claims.

The objects of this invention are attained, in general, by reacting from 0.9 to 0.98 mol of vinyl acetate with from 0.1 to 0.02 mol of crotonic acid in an aqueous medium in the presence of a polymerization catalyst and a water-soluble heteropolymer of vinyl acetate, maleic anhydride and an alkyl acid maleate, which heteropolymer is free of salt groups.

The following specific example is illustrative of the processes of this invention, but is not intended to be limitative thereof, parts and percentages being by weight.

Example

A monomer mixture of 259 parts of vinyl acetate, 8.1 parts of crotonic acid and 1.7 parts of benzoyl peroxide was added gradually over a period of 4 hours, with stirring, to 400 parts of water containing 1 part of a water-soluble heteropolymer of 1 mol of vinyl acetate, 0.55 mol of maleic anhydride and 0.45 mol of methyl acid maleate, the water being at a temperature of 66–67° C. prior to the addition of the monomer mixture. The water to which the monomer mixture was added was in a glass lined container equipped with a reflux condenser and stirrer, and during the monomer addition the water was maintained at a temperature sufficient to give gentle reflux of the monomer-water mixture. After all of the monomer was added the resulting mixture was maintained at the reflux temperature for 3 hours. At the end of this period of time, the temperature reached 92° C. and the polymerization was essentially complete. During the polymerization the vinyl acetate and crotonic acid copolymerized to form copolymer beads which were quite uniform in size and did not agglomerate to any appreciable extent during the course of the polymerization. The suspension of vinyl acetate-crotonic acid copolymer beads was next cooled to room temperature (about 25° C.), filtered and then washed with 300 parts of water. The washed copolymer beads were then dried for 4 hours at 30° C. and finally for 2 hours at a temperature of 60° C. The yield of copolymer beads, on a dry basis, was about 95% based on the starting monomers. The dry copolymer beads were of substantially uniform size, about 80% of the beads passing through a 14 mesh screen but being retained on a 30 mesh screen, and consisted of particles of 800 microns average diameter. These beads were readily soluble in dilute aqueous caustic or ammonia solutions without grinding or comminution, and contained 0.97 mol of combined vinyl acetate and about 0.03 mol of combined crotonic acid.

In carrying out the polymerization processes of this invention it is not essential to add a mixture of vinyl acetate and crotonic acid to the aqueous medium as illustrated in the example since satisfactory results are also obtained by adding each monomer separately to the aqueous medium. However, in either case it is necessary to add the monomers in the proportions desired in the copolymer. The procedure of adding a mixture of the monomers is preferred.

If all of the monomers are added at the beginning of the polymerization or are added to the aqueous medium over a short period of time, the particles formed vary considerably in size and the copolymer is not uniform in composition and is only partly soluble in dilute aqueous alkali. Moreover, the rate of addition of the monomers should not be carried out over too long a period of time since such procedure unduly prolongs the polymerization reaction beyond the time ordinarily required by a faster rate of addition. Satisfactory results have been obtained by adding the monomers to the aqueous medium at the rate of about 15 to 30% by weight of the total monomers employed per hour, but best results are obtained by adding the monomers to the aqueous medium at the rate of about 20 to 25% by weight of the total monomers employed per hour and such rate of addition is preferred. It is also desirable to add the monomers continuously, rather than intermittently, and at a more or less constant rate, preferably at a substantially constant rate.

In carrying out the processes of this invention, the weight ratio of monomer to aqueous medium may be varied somewhat, but it is desirable to employ from about 25 to 150 parts by weight of the monomers for every 100 parts by weight of the aqueous medium. In order to obtain the most efficient production and best yields of the copolymer, it is preferred to use from about 60 to 100 parts by weight of the monomers for every 100 parts of the aqueous medium.

The polymerization processes described herein are particularly applicable to the polymerization of vinyl acetate and crotonic acid in a mol ratio of 0.9 to 0.98 of the former to 0.1 to 0.02 of the latter, but are most suitable for the polymerization of vinyl acetate and crotonic acid in a mol ratio of 0.94 to 0.98 mol of vinyl acetate to 0.06 to 0.02 mol of crotonic acid. The copolymers obtained contain the vinyl acetate and crotonic acid in a combined state and in substantially the same proportions as the starting monomer mixture.

The use of a polymerization catalyst is essential in the polymerization processes of this invention. However, the amount and kind of catalyst employed may be varied considerably depending on the properties desired in the copolymer. Thus, it is possible to employ oil-soluble catalysts, for example, oil-soluble peroxide catalysts such as benzoyl peroxide, acetyl peroxide, tertiary-butyl hydroperoxide, cumene hydroperoxide, lauryl peroxide, methyl ethyl ketone peroxide and the like, and other oil-soluble catalysts such as ditertiary-butyl perphthalate, tertiary butyl perbenzoate and the like. The preferred oil-soluble catalysts are of the oil-soluble peroxide type, particularly benzoyl peroxide. When using the oil-soluble catalysts it is desirable to add them to the aqueous medium during the addition of the monomers to the aqueous medium, and it is preferred to incorporate such catalysts in a mixture of the vinyl acetate and crotonic acid prior to the addition of the monomers to the aqueous medium. The amount of oil-soluble catalyst employed may be varied depending on the desired molecular weight of the copolymer and the reaction rate desired. In general, the use of small amounts of catalyst results in copolymers of relatively high molecular weight while the use of larger amounts of catalyst provides copolymers of relatively low molecular weight. The amount of oil-soluble catalyst used may be within the range of about 0.1 to 5% by weight, based on the vinyl acetate and crotonic acid, but it is preferred to use from about 0.4 to 3% by weight of such catalyst, based on the vinyl acetate and crotonic acid.

An essential feature of the present invention is the use of a water-soluble heteropolymer of vinyl acetate, maleic anhydride and an alkyl acid maleate to prevent agglomeration of the copolymer particles during polymerization. The use of such a heteropolymer not only prevents such agglomeration but also provides polymer particles which are relatively uniform in size and are easily separated from the aqueous medium after polymerization is complete. Consequently, there is no appreciable tendency to upset the polymerization rate or other polymerization conditions; the particles obtained are easy to separate from the aqueous phase and dry; and the particles are of such size that they may be used without grinding or comminution.

The composition of the heteropolymer may be varied to some extent providing it is water-soluble. By "water-soluble" is meant the ability of the heteropolymer to dissolve in water completely without the use of alkali, since the heteropolymer must be free of salt groups. However, in order to be suitable for the purposes of this invention, it is essential that the heteropolymer contain at least 0.05 mol of alkyl acid maleate for each mol of vinyl acetate in such heteropolymer. The lower and upper limit of the alkyl acid maleate combined in the heteropolymer depends on the number of carbon atoms in the alkyl group of the maleate. For example, when the alkyl acid maleate is methyl acid maleate, it is possible to use a heteropolymer containing from 0.15 to 0.5 mol of combined methyl acid maleate per mol of combined vinyl acetate in the heteropolymer, the remainder of the heteropolymer being about 0.85 to 0.5 mol of combined maleic anhydride per mol of combined vinyl acetate, whereas when the alkyl acid maleate is a secondary butyl acid maleate it is usually only possible to employ a heteropolymer containing from 0.05 to 0.20 mol of combined secondary butyl acid maleate per mol of combined vinyl acetate in the copolymer, the remainder of the copolymer being about 0.95 to 0.80 mol of combined maleic anhydride per mol of combined vinyl acetate. As the number of carbon atoms in the alkyl acid maleate increase above 4 the upper limit of the mol ratio of combined alkyl acid maleate to combined vinyl acetate in the heteropolymer must decrease in order for the heteropolymer to be soluble in water per se. From the above discussion it is seen that the heteropolymers employed may contain from 0.95 to 0.50 mol of combined maleic anhydride and 0.05 mol to 0.50 mol of combined alkyl acid maleate per mol of combined vinyl acetate in the heteropolymer. The alkyl acid maleate preferably contains from 1 to 6 carbon atoms in the alkyl group. The preferred heteropolymers from the standpoint of the alkyl acid maleate contained therein are those in which the alkyl acid maleate is methyl acid maleate. The preferred heteropolymers from the standpoint of composition of the combined monomers are those which contain from 0.85 to 0.55 mol of combined maleic anhydride and from 0.15 to 0.45 mol of combined alkyl acid maleate per mol of combined vinyl acetate. Of course, it is to be understood that the heteropolymer may contain more than one alkyl acid maleate providing the total alkyl acid maleate content of the heteropolymer is within the range given above.

The heteropolymers may be prepared by any suitable process known in the art. For example, they may be prepared by the bulk polymerization of vinyl acetate, maleic anhydride and alkyl acid maleate in the presence of a polymerization catalyst such as benzoyl peroxide. The heteropolymer employed in the specific example was prepared in this manner and had a high molecular weight, the molecular weight being such that a 1% solution thereof in cyclohexanone had a specific viscosity between 3.8 and 9.1 centipoises at 25° C. The high molecular weight heteropolymers are preferred for use in the processes of the present invention since they are more effective at lower concentrations, and the heteropolymers having a molecular weight such that a 1% solution thereof in cyclohexanone has a specific viscosity between 3 and 12 centipoises at 25° C. are particularly suitable. The heteropolymers may also be prepared by polymerizing the vinyl acetate, maleic anhydride and alkyl acid maleate in an inert organic liquid, for example, ethylene dichloride, which is a solvent for the monomers but is a non-solvent for the heteropolymer.

The amount of heteropolymer employed in the processes of this invention may be varied considerably. In most instances it is desirable to employ at least 0.02% by weight of heteropolymer, based on the vinyl acetate and crotonic acid, and the upper limit generally is about 2% by weight of the heteropolymer, based on the vinyl acetate and crotonic acid. However, it is usually not desirable to use more than 0.5% by weight of the heteropolymer based on the vinyl acetate and crotonic acid. One of the advantages of the heteropolymers described herein over polyvinyl alcohol as a protective colloid is the fact that suspensions containing relatively coarse particles are obtained by using the heteropolymers in low concentrations of about 0.02 to 0.08% by weight, based on the vinyl acetate and crotonic acid, whereas polyvinyl alcohol must be used in amounts of at least 0.11% by weight on the same basis to obtain suspensions of the copolymer particles and even then the particles are so fine they are difficult to process and handle. In certain instances it is also possible to employ as low as 0.01% by weight of the heteropolymer, based on the vinyl acetate and crotonic acid.

A further advantage of the heteropolymers lies in the fact that they may be used as the sole protective colloid or dispersing agent during the polymerization of the monomers. When they are used in this manner, as illustrated in the specific example, they provide an aqueous medium having a pH of about 2.0 to 4.5, and the polymerization is ordinarily carried out within this pH range. It is possible, however, to use common polymerization additives, other than a polymerization catalyst which is essential, but it is preferred to carry out the polymerization solely in the presence of water, the heteropolymer and a polymerization catalyst. When polymerization additives are employed they should be acidic to neutral, non-salt forming substances such as anionic surface active agents as, for example, alkali metal salts of alkyl benzene sulfonic acids, in which the alkyl chain contains at least 10 carbon atoms, alkali metal salts of sulfonated or sulfated fatty alcohols or fatty acids containing at least 10 carbon atoms, alkali metal salts of dialkyl esters of sulfosuccinic acid, in which the alkyl groups each contain at least 4 carbon atoms, and the like; and non-ionic surface agents. When such substances are employed they should ordinarily be used in small amounts, that is, less than 0.2% by weight, based on the monomers, and preferably between about 0.001 and 0.1% by weight, based on the monomers. It is also possible to use acidic to neutral, non-salt-forming polymerization modifying agents to control the length of the vinyl acetate-crotonic acid chain, for example, agents such as alkyl mercaptans, especially dodecyl mercaptan, carbon tetrachloride and the like.

The temperature used during the polymerization reaction may be varied, but the polymerization is preferably carried out at the reflux temperature of the monomer-aqueous phase mixture at atmospheric pressure. Higher temperatures may be used by carrying out the polymerization at super-atmospheric pressures in a closed container. For example, temperatures up to 130° C. may be used. However, when the polymerization is carried out at superatmospheric pressure in a closed container various operating difficulties are encountered which are not met with when operating under reflux conditions at atmospheric pressure, and accordingly the latter procedure is preferred. Lower temperatures may also be used, but also have disadvantages. When the polymerization is carried out at atmospheric pressure, that is, at an absolute pressure of about 760 millimeters of mercury, under a reflux condenser, the reflux temperature is initially between about 65 and 70° C. As the polymerization proceeds and substantially all of the vinyl acetate copolymerizes with the crotonic acid, the reflux temperature increases and the temperature of the polymerization mixture is raised accordingly. In general, when the reflux temperature at atmospheric pressure rises to at least 85° C., the polymerization is substantially complete, although it is preferred to continue the reaction until the reflux temperature at atmospheric pressure is between about 90 and 95° C. in order to obtain optimum yields. The polymerization mixture, which contains the copolymer beads or particles suspended therein, is then cooled and the copolymer beads may be separated from the aqueous phase at this stage, although it is preferred first to remove the major portion of unreacted vinyl acetate by a current of air or inert gas or distillation at reduced pressure or by a combination thereof (prior to the cooling of the polymerization mixture) while maintaining the temperature of the mixture at substantially the reflux temperature.

After the polymerization mixture is cooled to a suitable temperature, for example, a temperature of about 15 to 35° C. the copolymer beads may be separated from the aqueous phase by filtration, centrifugation or the like. After the copolymer beads have been separated from the aqueous from the aqueous phase, it is preferable to wash the beads with cold water, that is, water at a temperature below 30° C., to remove impurities. The wet beads may be dried at various temperatures, but the use of relatively high temperatures such as 130° C. or more causes the beads to coalesce and to form agglomerates which are difficult to dissolve in aqueous alkali unless the agglomerates are first ground or comminuted to smaller sized particles. By using lower temperatures, it is possible to dry the beads without forming large agglomerates. Drying may be carried out, for example, at a temperature between 35 and 100° C., with or without a vacuum, and preferably with stirring, the permissible temperature becoming higher as the particles lose their moisture.

By following the processes described herein, it is possible to obtain dry copolymer beads or particles, the major portion of which pass through a 14 mesh but are retained on a 30 mesh screen, and in most instances this major portion will comprise from about 70 to 90% by weight of the copolymer particles. The amount of copolymer particles retained on a 14 mesh screen is usually less than 5% by weight of the particles, and these particles are usually not above 1 millimeter in diameter. The over size particles may be ground if desired.

The dry copolymer beads do not have to be ground or comminuted and are soluble in dilute aqueous solutions of sodium carbonate or ammonia with agitation. The resulting solutions or colloidal dispersions may be used for sizing textile warp yarns or for stiffening felted bodies composed principally of animal fibers or furs.

What is claimed is:

1. A process of copolymerizing vinyl acetate and crotonic acid which comprises heating vinyl acetate and crotonic acid in a mol ratio of 0.9 to 0.98:0.1 to 0.02 in an aqueous medium in the presence of an oil-soluble peroxide polymerization catalyst and a water-soluble heteropolymer of vinyl acetate, maleic anhydride and an alkyl acid maleate, said heteropolymer containing at least 0.05 mol of combined alkyl acid maleate per mol of combined vinyl acetate.

2. A process of copolymerizing vinyl acetate and crotonic acid which comprises heating, under reflux conditions and with agitation, vinyl acetate and crontonic acid in a mol ratio of 0.9 to 0.98:0.1 to 0.02 in an aqueous medium in the presence of an oil-soluble peroxide polymerization catalyst and a water-soluble heteropolymer consisting of vinyl acetate and from 0.95 to 0.5 mol of maleic anhydride and 0.05 to 0.5 mol of an alkyl acid maleate per mol of vinyl acetate, said heteropolymer being soluble in water per se, and continuing the polymerization at the reflux temperature at atmospheric pressure.

3. A process as in claim 2, but further characterized in that the alkyl acid maleate contains from 1 to 6 carbon atoms in the alkyl group.

4. A process as in claim 3, but further characterized in that the alkyl acid maleate is methyl acid maleate.

5. A process of copolymerizing vinyl acetate and crotonic acid which comprises adding with stirring vinyl acetate and crontonic acid in a mol ratio of 0.9 to 0.98:0.1 to 0.02 to an aqueous medium, which is at the reflux temperature at atmospheric pressure of the mixture thus obtained, in the presence of an oil-soluble peroxide polymerization catalyst and from 0.01 to 2% by weight, based on the vinyl acetate and crontonic acid, of a water-soluble heteropolymer of vinyl acetate and from 0.95 to 0.5 mol of maleic anhydride and 0.05 to 0.5 mol of alkyl acid maleate per mol of vinyl acetate, said heteropolymer being soluble in water per se, said vinyl acetate and crontonic acid being employed in amounts of 25 to 150 parts by weight for every 100 parts by weight of aqueous medium and being added at the rate of 15 to 30% by weight per hour of the total monomers added, maintaining the temperature of the resulting mixture at the reflux temperature at atmospheric pressure during the addition of vinyl acetate and crotonic acid, thereafter maintaining the temperature of the mixture at the reflux temperature at atmospheric pressure until the reflux temperature rises to at least 85° C., cooling the mixture, separating the copolymer beads formed during the reaction from the mixture and drying the copolymer beads.

6. A process as in claim 5, but further characterized in that the alkyl acid maleate contains from 1 to 6 carbon atoms in the alkyl group.

7. A process as in claim 5, but further characterized in that the alkyl acid maleate is methyl acid maleate.

8. A process of copolymerizing vinyl acetate and crotonic acid which comprises adding with stirring under reflux conditions vinyl acetate and crotonic acid in a mol ratio of 0.9 to 0.98:0.1 to 0.02 to an aqueous meduim which is at the reflux temperature at atmospheric pressure of the mixture thus obtained in the presence of an oil-soluble peroxide polymerization catalyst, said aqueous medium having a pH of about 2.0 to 4.5 and containing a water-soluble heteropolymer consisting of vinyl acetate and from 0.85 to 0.55 mol of maleic anhydride and 0.15 to 0.45 mol of alkyl acid maleate, in which the alkyl group contains from 1 to 6 carbon atoms, per mol of combined vinyl acetate and being free of salt groups, said vinyl acetate and crotonic acid being employed in amounts of 60 to 100 parts by weight for every 100 parts by weight of aqueous medium and being added at the rate of 15 to 30% by weight per hour of the total monomers added, maintaining the temperature of the resulting mixture at the reflux temperature at atmospheric pressure during the addition of vinyl acetate and crotonic acid, the total amount of heteropolymer employed being from 0.02 to 0.5% by weight, based on the total vinyl acetate and crotonic acid added, thereafter maintaining the temperature of the mixture at the reflux temperature at atmospheric pressure until the reflux temperature rises to at least 85° C., cooling the mixture, separating from the mixture the copolymer beads formed during the reaction and drying the copolymer beads.

9. A process as in claim 8, but further characterized in that the alkyl acid maleate is methyl acid maleate.

10. A process of copolymerizing vinyl acetate and crotonic acid which comprises adding with stirring under reflux conditions vinyl acetate and crotonic acid in a mol ratio of 0.94 to 0.98:0.06 to 0.02 and an oil-soluble peroxide polymerization catalyst to an aqueous medium having a pH of 2.0 to 4.5 and consisting of water and from 0.02 to 0.08% by weight, based on the vinyl acetate and crotonic acid, of a water-soluble heteropolymer of vinyl acetate and from 0.85 to 0.55 mol of maleic anhydride and 0.15 to 0.45 mol of methyl acid maleate per mol of vinyl acetate combined in said heteropolymer and being free of salt groups, the aqueous medium being at the reflux temperature at atmospheric pressure of the mixture thus formed, said vinyl acetate and crotonic acid being employed in amounts of 60 to 100 parts by weight per 100 parts by weight of aqueous medium and being added to the aqueous medium at a substantially constant rate of 20 to 25% by weight per hour of the total vinyl acetate and crotonic acid employed, maintaining the temperature of the resulting mixture at the reflux temperature at atmospheric pressure during the addition of the vinyl acetate and cotonic acid, thereafter maintaining the temperature of the mixture at the reflux temperature at atmospheric pressure until the reflux temperature rises to 90 to 95° C., cooling the mixture, separating from the mixture the copolymer beads formed during the reaction and drying the copolymer beads.

References Cited in the file of this patent

UNITED STATES PATENTS

| | | |
|---|---|---|
| 2,263,598 | Starck et al. | Nov. 25, 1941 |
| 2,486,855 | Lavin et al. | Nov. 1, 1949 |